United States Patent
Cheng et al.

(10) Patent No.: US 9,797,028 B2
(45) Date of Patent: Oct. 24, 2017

(54) METHOD OF PURIFYING YTTRIUM

(71) Applicant: NATIONAL CHUNG SHAN INSTITUTE OF SCIENCE AND TECHNOLOGY, Taoyuan (TW)

(72) Inventors: Ming-Chin Cheng, Taoyuan (TW); Tung-Chun Wu, Taoyuan (TW); Ching-Yu Tso, Taoyuan (TW); Hsiou-Jeng Shy, Taoyuan (TW); Shien-Jen Yang, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 220 days.

(21) Appl. No.: 14/887,896

(22) Filed: Oct. 20, 2015

(65) Prior Publication Data
US 2017/0107597 A1 Apr. 20, 2017

(51) Int. Cl.
C22B 59/00 (2006.01)
C22B 7/00 (2006.01)
C22B 3/44 (2006.01)
C22B 3/06 (2006.01)

(52) U.S. Cl.
CPC .............. *C22B 59/00* (2013.01); *C22B 3/065* (2013.01); *C22B 3/44* (2013.01); *C22B 7/007* (2013.01)

(58) Field of Classification Search
CPC ........... C22B 59/00; C22B 3/065; C22B 3/44; C22B 7/007
See application file for complete search history.

(56) References Cited

U.S. PATENT DOCUMENTS 3,640,678 A * 2/1972 Trimble .................. C22B 59/00
423/21.5
2013/0189170 A1* 7/2013 Monk .................. C01F 17/0043
423/21.1

FOREIGN PATENT DOCUMENTS

CN 101899300 * 12/2010
CN 101956119 * 1/2011

OTHER PUBLICATIONS

CN 101956119 published Jan. 2011. Machine translation.*
CN 101899300 published Dec. 2010. Machine translation.*

* cited by examiner

*Primary Examiner* — George Wyszomierski
*Assistant Examiner* — Tima M McGuthry Banks
(74) *Attorney, Agent, or Firm* — Schmeiser, Olsen & Watts, LLP

(57) ABSTRACT

A method of purifying yttrium involves purifying element yttrium by high-temperature saturated dissolution, low-temperature recrystallization, high-temperature reduction and vaporization-based removal of impurities, in a simple manner, and at a low cost, such that yttrium element is unlikely to be contaminated by any raw material used in a manufacturing process.

9 Claims, 1 Drawing Sheet

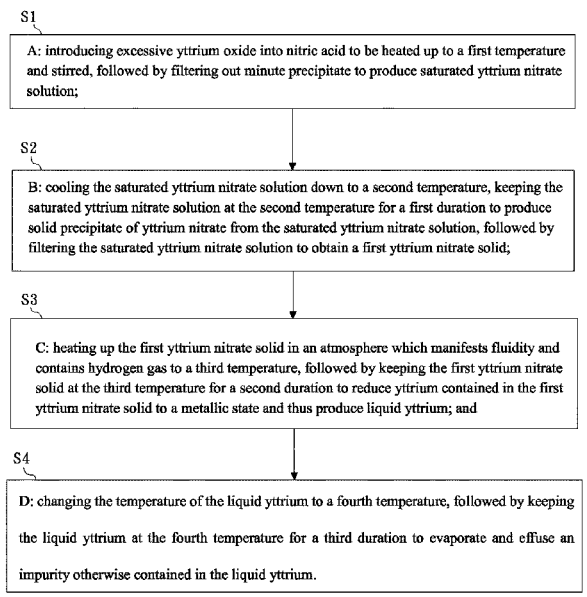

S1

A: introducing excessive yttrium oxide into nitric acid to be heated up to a first temperature and stirred, followed by filtering out minute precipitate to produce saturated yttrium nitrate solution;

S2

B: cooling the saturated yttrium nitrate solution down to a second temperature, keeping the saturated yttrium nitrate solution at the second temperature for a first duration to produce solid precipitate of yttrium nitrate from the saturated yttrium nitrate solution, followed by filtering the saturated yttrium nitrate solution to obtain a first yttrium nitrate solid;

S3

C: heating up the first yttrium nitrate solid in an atmosphere which manifests fluidity and contains hydrogen gas to a third temperature, followed by keeping the first yttrium nitrate solid at the third temperature for a second duration to reduce yttrium contained in the first yttrium nitrate solid to a metallic state and thus produce liquid yttrium; and

S4

D: changing the temperature of the liquid yttrium to a fourth temperature, followed by keeping the liquid yttrium at the fourth temperature for a third duration to evaporate and effuse an impurity otherwise contained in the liquid yttrium.

METHOD OF PURIFYING YTTRIUM

FIELD OF THE INVENTION

The present invention relates to methods of purifying yttrium and more particularly to a method of purifying yttrium by following the steps of high-temperature saturated dissolution, low-temperature recrystallization, high-temperature reduction and vaporization-based removal of impurities.

BACKGROUND OF THE INVENTION

Rare earth elements abound in, and account for around 0.0153% of the mass of, the crust of the Earth. The density of distribution of rare earth elements in the crust of the Earth is much lower than that of common metals, such as zinc, tin, and cobalt. Among rare earth elements, cerium has the largest density (0.0046%) of distribution in the crust of the Earth, then come yttrium, neodymium, and lanthanum. Rare earth elements mostly feature an enrichment ratio of less than 1%, though some feature a maximum enrichment ratio of 4% to 9%. Therefore, rare earth mining incurs very high costs, not to mention that it is extremely difficult to separate and produce highly pure rare earth elements. Hence, rare earth mining will not be cost-effective, unless the products thereof are sold at high prices. Rare earth metals are required for the manufacturing of necessities, such as vehicle catalyst adapters, catalysts for use in petroleum refinery, magnetic materials for use with permanent magnetic motors, thunderbolts for use in a cigarette lighter, glass, and dyes for use with porcelains, as well as indispensable additives for use in processes carried out in high-tech industries, such as aerospace industry, electronic industry, laser-related industry, nuclear power generation, and superconductor-related industry. When used in metallurgy, rare earth metals enhance the performance of the alloys of steel, aluminum, magnesium and titanium. Although global annual revenues derived from transactions of rare earth metals nowadays total to billions of U.S. Dollars, rare earth metals are indispensable to high-tech industries. Rare earth metals are regarded as military tactical resources by major industrialized countries around the world. Therefore, rare earth materials are dubbed "industrial vitamins," "Mother of new materials" and "Gold in the $21^{st}$ century," and the rare earth industry is referred to as a "rising industry."

SUMMARY OF THE INVENTION

The present invention provides a method of purifying yttrium. The method involves purifying element yttrium by high-temperature saturated dissolution, low-temperature recrystallization, high-temperature reduction and vaporization-based removal of impurities, in a simple manner, and at a low cost, such that yttrium element is unlikely to be contaminated by any raw material used in a manufacturing process.

The present invention provides a method of purifying yttrium, comprising the steps of: introducing excessive yttrium oxide into nitric acid to be heated up to a first temperature and stirred, followed by filtering out minute precipitate to produce saturated yttrium nitrate solution; cooling the saturated yttrium nitrate solution down to a second temperature, keeping the saturated yttrium nitrate solution at the second temperature for a first duration to produce solid precipitate of yttrium nitrate from the saturated yttrium nitrate solution, followed by filtering the saturated yttrium nitrate solution to obtain a first yttrium nitrate solid; heating up the first yttrium nitrate solid in an atmosphere which manifests fluidity and contains hydrogen gas to a third temperature, followed by keeping the first yttrium nitrate solid at the third temperature for a second duration to reduce yttrium contained in the first yttrium nitrate solid to a metallic state and thus produce liquid yttrium; and changing the temperature of the liquid yttrium to a fourth temperature, followed by keeping the liquid yttrium at the fourth temperature for a third duration to evaporate and effuse an impurity otherwise contained in the liquid yttrium.

In a preferred embodiment of the present invention, a method of purifying yttrium is characterized in that: the first temperature is 60° C.; the second temperature is 0° C.; the third temperature is 1580° C.; the fourth temperature is 1530° C.; the first duration is 30 minutes; the second duration is 30 minutes; and the third duration is 30 minutes.

In a preferred embodiment of the present invention, a method of purifying yttrium is characterized in that a liquid yttrium at the fourth temperature is placed in a vacuum environment to thereby speed up impurity evaporation and effusion.

The above overview, the description below, and the accompanying diagram aim to explain the measures taken to achieve the objective of the present invention and the advantages thus achieved. The other objectives and advantages of the present invention are described below as well.

BRIEF DESCRIPTION OF THE DRAWING

To enable persons skilled in the art to fully understand the objectives, features, and advantages of the present invention, the present invention is hereunder illustrated with specific embodiments in conjunction with the accompanying diagram, in which:

FIG. 1 is a schematic view of the process flow of a method of purifying yttrium according to the present invention.

DETAILED DESCRIPTION OF THE PREFERRED EMBODIMENTS

Implementation of the present invention is hereunder illustrated with a specific embodiment to enable persons skilled in the art to easily understand the other advantages and benefits of the present invention according to the disclosure contained in the specification.

The present invention provides a method of purifying yttrium. The method entails producing a saturated yttrium nitrate solution from impurity-containing yttrium oxide with nitric acid, and heating up the saturated yttrium nitrate solution to reduce yttrium to a metallic state, so as to produce high-purity yttrium. In general, metallic nitrates are very soluble in water, so is yttrium nitrate. Table 1 shows the solubility of yttrium nitrate at different temperatures and indicates that the solubility of yttrium nitrate increases with temperature greatly. Therefore, given the above physical property of yttrium nitrate, yttrium oxide is dissolved in nitric acid at a high temperature to thereby get a saturated yttrium nitrate solution, and then the saturated yttrium nitrate solution is cooled down to produce a precipitate therefrom. For example, at 60° C., excessive yttrium oxide is introduced into nitric acid, stirred, and filtered to get the yttrium oxide which has not dissolved, thereby producing a saturated yttrium nitrate solution. Any impurity initially contained in the yttrium oxide also dissolves in the saturated yttrium nitrate solution. However, the impurity is too little to be saturated; hence, if the solution is cooled down, a large amount of yttrium nitrate will precipitate, thereby purifying yttrium. Furthermore, in an environment favorable to reduction, such as a hydrogen-containing environment, a sample is heated up to a temperature, say 1580° C., such that most of the elements of the sample are reduced to a metallic state, and then the impurity in element yttrium is vaporized by high-temperature vaporization, thereby increasing the purity of element yttrium.

TABLE 1 solubility of yttrium nitrate at different temperatures

| | temperature | | | | | | |
|---|---|---|---|---|---|---|---|
| | 0° C. | 10° C. | 20° C. | 30° C. | 40° C. | 50° C. | 60° C. |
| solubility (g) | 93.1 | 106 | 123 | 143 | 163 | — | 200 |

Referring to FIG. 1, there is shown a schematic view of the process flow of a method of purifying yttrium according to the present invention. As shown in the diagram, the method comprises the steps of: A: introducing excessive yttrium oxide into nitric acid to be heated up to a first temperature and stirred, followed by filtering out minute precipitate to produce saturated yttrium nitrate solution; B: cooling the saturated yttrium nitrate solution down to a second temperature, keeping the saturated yttrium nitrate solution at the second temperature for a first duration to produce solid precipitate of yttrium nitrate from the saturated yttrium nitrate solution, followed by filtering the saturated yttrium nitrate solution to obtain a first yttrium nitrate solid S2; C: heating up the first yttrium nitrate solid in an atmosphere which manifests fluidity and contains hydrogen gas to a third temperature, followed by keeping the first yttrium nitrate solid at the third temperature for a second duration to reduce yttrium contained in the first yttrium nitrate solid to a metallic state and thus produce liquid yttrium S3; and D: changing the temperature of the liquid yttrium to a fourth temperature, followed by keeping the liquid yttrium at the fourth temperature for a third duration to evaporate and effuse an impurity otherwise contained in the liquid yttrium S4. The yttrium oxide weighs 100 g, and the nitric acid is 100 ml in volume. The first temperature is 60° C. The second temperature is 0° C. The third temperature is 1580° C. The fourth temperature is 1530° C. The first duration is 30 minutes. The second duration is 30 minutes. The third duration is 30 minutes. In step D, the liquid yttrium at the fourth temperature is placed in a vacuum environment to thereby speed up impurity evaporation and effusion.

The parameters referred to in the aforesaid steps, namely, the yttrium oxide weight, nitric acid volume and temperature in step A, the cool-down temperature and constant-temperature duration in step B, the high-temperature reduction temperature and hold duration in step C; and the metal vaporization temperature, duration and atmosphere in step D, are illustrative, rather than restrictive, of the present invention.

To verify the feasibility and advantages of the method of the present invention, experiments are conducted under different processing conditions. Table 2 shows the weight percent of various elements contained in the raw material (yttrium oxide) in the initial experiment conducted according to the present invention, wherein the weight percent of yttrium is 95.02, the main impurity of the raw material is europium, and minor impurities include calcium, aluminum, zinc, magnesium, iron and indium.

TABLE 2 weight percent of elements contained in raw materials

| | element | | | | | | | |
|---|---|---|---|---|---|---|---|---|
| | calcium | yttrium | aluminum | zinc | magnesium | iron | europium | indium |
| wt. % | 0.63 | 95.02 | 0.36 | 0.17 | 0.16 | 0.19 | 3.30 | 0.17 |

Table 3 shows that yttrium oxide is dissolved at different temperatures, cooled down, and eventually recrystallized at different temperatures. In embodiment 1, a saturated yttrium nitrate solution is produced at 60° C. and then cooled down to 20° C., such that the purity of yttrium increases from 95.02 wt. % to 98.03 wt. %, whereas the concentrations of the other impurities decrease significantly. This phenomenon proves that, with high-temperature dissolution and low-temperature crystallization, the purity of elements can be increased. In embodiment 2, the saturated yttrium nitrate solution is produced at 60° C. and then cooled down to 0° C., such that the purity of yttrium increases from 95.02 wt. % to 98.69 wt. %, whereas the concentrations of the other impurities decrease significantly. In embodiment 3, the saturated yttrium nitrate solution is produced at 80° C. and then cooled down to 0° C., indicating that yttrium element is of the highest purity. The above experiments show that with high-temperature dissolution and low-temperature crystallization, the purity of elements can be increased.

TABLE 3 weight percent of elements contained in a product at different soluble and recrystallization temperature

| | embodiment 1 | embodiment 2 | embodiment 3 |
|---|---|---|---|
| soluble temperature ° C. | 60 | 60 | 80 |
| recrystallization temperature ° C. | 20 | 0 | 0 |
| calcium wt. % | 0.07 | 0.06 | 0.05 |
| yttrium wt. % | 98.47 | 98.69 | 98.93 |
| aluminum wt. % | 0.03 | 0.02 | 0.02 |
| zinc wt. % | 0.06 | 0.05 | 0.04 |
| magnesium wt. % | 0.04 | 0.04 | 0.03 |
| iron wt. % | 0.04 | 0.03 | 0.01 |
| europium wt. % | 1.21 | 1.06 | 0.91 |
| indium wt. % | 0.08 | 0.05 | 0.01 |

In embodiment 1, the product is used as a raw material for use in heat treatment and removal of impurity, and its results are shown in Table 4. In embodiment 4, the reduction temperature is set to 1500° C., and then the solution is kept at 1500° C. for 30 minutes in order to remove the impurities. At the end of the experiment, except for zinc, all the impurities do not decrease in weight percent. Although it is possible that allowing reduction to take place at 1500° C. leads to the consequence that some of the elements are reduced to a metallic state, the boiling points of all the elements except zinc are higher than 1500° C., and thus the removal of impurity at this temperature only causes zinc to vaporize and effuse. In embodiment 5, reduction takes place at 1580° C., and then the solution is kept at 1580° C. to remove impurities; at the end of the experiment, in addition to zinc, element europium is greatly removed, because metal europium has a boiling point (1529° C.) which is lower than 1580° C. Therefore, keeping the solution at this temperature causes metal europium to vaporize and effuse. Both embodiment 4 and embodiment 5 show that reducing an impurity of yttrium nitrate to a metallic state and then keeping the solution at a temperature higher than its boiling point is effective in removing the impurity. In embodiment 6, reduction takes place at 1580° C., and then keeping the solution at this temperature causes the removal of impurity, and then a vacuum environment (0.2 torr) is created with a vacuum pump; the result of embodiment 6 shows that europium vaporizes and effuses fully under a vacuum condition, thereby increasing the purity of yttrium greatly.

TABLE 4 weight percent of elements contained in products produced at different high-temperature reduction and vaporization and effusion temperature

|  | embodiment 4 | embodiment 5 | embodiment 6 |
| --- | --- | --- | --- |
| reduction temperature ° C. | 1500 | 1580 | 1580 |
| impurity removal temperature ° C. | 1500 | 1580 | 1580 |
| impurity removal atmosphere | hydrogen | hydrogen | vacuum |
| calcium wt. % | 0.07 | 0.07 | 0.07 |
| yttrium wt. % | 98.53 | 99.16 | 99.81 |
| aluminum wt. % | 0.03 | 0.03 | 0.03 |
| zinc wt. % | 0.00 | 0.00 | 0.00 |
| magnesium wt. % | 0.04 | 0.04 | 0.04 |
| iron wt. % | 0.04 | 0.04 | 0.02 |
| europium wt. % | 1.21 | 0.58 | 0.00 |
| indium wt. % | 0.08 | 0.07 | 0.03 |

The reason why yttrium oxide is introduced into nitric acid and its temperature is raised to prepare a concentrated yttrium nitrate solution with a method of purifying yttrium according to the present invention is to facilitate the subsequent cooling measures taken, such that not only does yttrium give rise to crystals in the form of yttrium nitrate, but also is highly pure yttrium produced by temperature adjustment because the solubility of yttrium nitrate in water varies with temperature. The method of the present invention is not restricted to production of a saturated yttrium nitrate solution.

Regarding the method of purifying yttrium according to the present invention, chemical substances are reduced to a metallic state, and then their impurities vaporize and effuse at a high temperature to increase the purity of yttrium, wherein reduction operating temperature is set to any reduction temperature at which impurity removal can take occur or at a temperature higher than the reduction temperature, because the impurity must be reduced to a metallic state in which vaporization and effusion can occur. The reduction operating temperature is set to any reduction temperature at which impurity removal can take occur or at a temperature higher than the reduction temperature, because the impurity must vaporize to facilitate its effusion. The gaseous atmosphere whereby impurities vaporize and effuse can be achieved by vacuum pumping, so as to speed up the vaporization and effusion of the impurities.

The method of the present invention is implemented under different processing conditions, such as a dissolution temperature of yttrium oxide, a crystallization temperature of yttrium nitrate, a reduction temperature of metal, and an impurity vaporization and removal temperature, to thereby increase the purity of yttrium. According to the present invention, the impurity vaporization and evaporation temperature thus set must be higher than the melting point (1226° C.) of yttrium but lower than the boiling point (2730° C.) of yttrium; under such a condition, yttrium is a liquid with fluidity, and its impurities are likely to effuse and evaporate. However, if the set temperature is close to the melting point of yttrium, less yttrium will get lost.

The method of purifying yttrium according to the present invention increases the purity of element yttrium, features an easy operating process, dispenses with complicated unit operations and equipment of unit processes, and reduces equipment costs. The operation process carried out according to the present invention produces no waste water, dispenses with any back-end waste water treatment equipment, cuts equipment cost, and cuts staffing costs.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A method of purifying yttrium, comprising the steps of:
A: introducing excessive yttrium oxide into nitric acid and heating the yttrium oxide and nitric acid up to a first temperature and stirring, followed by filtering out a minute precipitate to produce saturated yttrium nitrate solution;
B: cooling the saturated yttrium nitrate solution down to a second temperature, keeping the saturated yttrium nitrate solution at the second temperature for a first duration to produce solid precipitate of yttrium nitrate from the saturated yttrium nitrate solution, followed by filtering the saturated yttrium nitrate solution to obtain a first yttrium nitrate solid;
C: heating up the first yttrium nitrate solid in an atmosphere which manifests fluidity and contains hydrogen gas to a third temperature, followed by keeping the first yttrium nitrate solid at the third temperature in the atmosphere for a second duration to reduce yttrium contained in the first yttrium nitrate solid to a metallic state and thus produce liquid yttrium; and
D: changing the temperature of the liquid yttrium to a fourth temperature, followed by keeping the liquid yttrium at the fourth temperature for a third duration to evaporate and effuse an impurity otherwise contained in the liquid yttrium.

2. The method of claim 1, wherein the first temperature is 60° C.

3. The method of claim 1, wherein the second temperature is 0° C.

4. The method of claim 1, wherein the third temperature is 1580° C.

5. The method of claim 1, wherein the fourth temperature is 1530° C.

6. The method of claim 1, wherein the first duration is 30 minutes.

7. The method of claim 1, wherein the second duration is 30 minutes.

8. The method of claim 1, wherein the third duration is 30 minutes.

9. The method of claim 1, wherein, in step D, a liquid yttrium at the fourth temperature is placed in a vacuum environment to thereby speed up impurity evaporation and effusion.

* * * * *